United States Patent
Johnston et al.

(10) Patent No.: US 11,241,923 B2
(45) Date of Patent: Feb. 8, 2022

(54) MITIGATION OF BOOSTER-INDUCED EFFECTS

(71) Applicant: Aspen Custom Trailers Inc., Leduc (CA)

(72) Inventors: Phil Johnston, Leduc (CA); Wayne Rootsaert, Leduc (CA)

(73) Assignee: Aspen Custom Trailers Inc., Leduc (CA)

( * ) Notice: Subject to any disclaimer, the term of this patent is extended or adjusted under 35 U.S.C. 154(b) by 186 days.

(21) Appl. No.: 16/795,441

(22) Filed: Feb. 19, 2020

(65) Prior Publication Data

US 2020/0282781 A1 Sep. 10, 2020

(30) Foreign Application Priority Data

Mar. 6, 2019 (CA) ................................ CA 3035888

(51) Int. Cl.
| | |
|---|---|
| *B60D 1/32* | (2006.01) |
| *B62D 53/06* | (2006.01) |
| *B62D 61/10* | (2006.01) |
| *B60D 1/62* | (2006.01) |
| *B60P 3/41* | (2006.01) |

(52) U.S. Cl.
CPC .............. *B60D 1/322* (2013.01); *B60D 1/62* (2013.01); *B62D 53/067* (2013.01); *B62D 61/10* (2013.01); *B60P 3/41* (2013.01)

(58) Field of Classification Search
CPC ...... B60D 1/247; B60D 1/322; B62D 53/005; B62D 53/06; B62D 53/067; B62D 53/068; B62D 53/0871; B62D 61/10; B62D 53/04

USPC ............................ 280/405.1, 406.1, 407, 408
See application file for complete search history.

(56) References Cited

U.S. PATENT DOCUMENTS

| | | | | |
|---|---|---|---|---|
| 3,414,072 | A * | 12/1968 | Hodges, Jr. ............... | B62D 5/09 180/24 |
| 5,335,856 | A * | 8/1994 | Nathan ................. | A01B 59/042 172/324 |
| 6,050,578 | A | 4/2000 | Beck | |
| 6,938,716 | B1 | 9/2005 | Eull | |
| 7,731,215 | B2 | 6/2010 | Cornish | |
| 8,033,561 | B2 * | 10/2011 | McCune ................. | B60D 1/322 280/455.1 |
| 9,127,416 | B2 * | 9/2015 | Klockner ................. | B60D 1/62 |
| 2002/0195795 | A1 * | 12/2002 | Brown ................. | B62D 53/005 280/492 |
| 2004/0183372 | A1 | 9/2004 | Heuer et al. | |

(Continued)

OTHER PUBLICATIONS

Berg, Tom, Rollover Control: Electronic stability technology; https://www.truckinginfo.com/149412/rollover-control-electronic-stability-technology; Jun. 10, 2009; 4 pages.

*Primary Examiner* — Kevin Hurley
*Assistant Examiner* — Hosam Shabara
(74) *Attorney, Agent, or Firm* — Lowe Graham Jones PLLC

(57) ABSTRACT

An improved articulated heavy haul trailer combination comprises a trailing accessory vehicle such as a booster coupled to a main trailer by a coupling. The coupling includes a horizontal hinge, a vertical hinge that allows the trailing accessory vehicle to yaw in a horizontal plane, a spreader extending between the hinges and a hydraulic piston and cylinder. A turn sensor mounted on said combination detects yawing, and a controller reduces the piston and cylinder's downward biasing force on the coupling.

2 Claims, 8 Drawing Sheets

(56) References Cited

U.S. PATENT DOCUMENTS

| | | |
|---|---|---|
| 2007/0256878 A1 | 11/2007 | Tandy et al. |
| 2007/0260386 A1 | 11/2007 | Tandy et al. |
| 2016/0214586 A1 | 7/2016 | Michaelsen et al. |
| 2018/0065603 A1 | 3/2018 | Braunberger |
| 2018/0304884 A1 | 10/2018 | Jundt et al. |

* cited by examiner

MITIGATION OF BOOSTER-INDUCED EFFECTS

FIELD OF THE INVENTION

This invention relates to heavy haul trailers. More particularly this invention relates to vehicle control and stability for heavy haul trailers that use boosters and other auxiliary vehicles.

BACKGROUND OF THE INVENTION

Unpowered articulated auxiliary vehicles such as jeeps and boosters are often used with heavy haul trailers to distribute the load over several axles and to facilitate turns with longer loads. While they are effective to serve such purposes, the yaw of an articulated booster behind a trailer presents a problem during turns. During a turn the trailing booster tends to push the leading trailer straight and impede the trailer from tracking the turn. Because the trailer is turning, that tangential force from the booster is converted to an angular force tending to lift the inboard side of the booster. Some of that torque is transmitted to the trailer itself and is often exhibited as a tendency to roll the trailer (and the booster). The angular force induced by a yawing booster does not depend on the presence of a payload.

A more well-known concern in the trucking and trailer industry is rollovers induced by the payload of the trailer, the location of the center of gravity of the payload and the speed at which a turn is engaged. The most common approach to mitigating the risk of rollovers is to slow the trailer down by withdrawing drive power or by braking (see *Rollover Control: Electronic Stability Technology*, Fleet Management, www.truckinginfo.com).

As payloads play the largest part in most rollovers, the particular contribution of an angular force induced by a yawing booster to disrupting turns does not appear to be recognized or addressed in the prior art.

U.S. Pat. No. 6,050,578 discloses a log trailer with a non-yawing booster axle. A pressure arm connects a pivoting log bunk to the booster. As the trailer turns, the log bunks pivot, thereby displacing the forward end of the pressure arm off-center and relieving some of the pressure on the booster.

Another non-yawing booster is disclosed in U.S. Pat. No. 6,938,716. A cement truck includes a booster. The risk of rollover presented by the rolling drum is detected on portions of the truck. The truck and/or the rotation of the drum are slowed down, and the booster may be relieved by unlading a hydraulic cylinder extending from the truck to the booster.

It is an object of the present invention to mitigate the tendency of a trailer and articulated booster combination to roll during a turn as the booster yaws in relation to the trailer.

It is a further object of the invention to mitigate the tendency of the booster to exert a force tending to prevent a trailer from properly tracking a turn.

These and other objects will be better understood by reference to this application as a whole. Not all of the objects are necessarily met by all embodiments of the invention described below or by the invention defined by each of the claims.

SUMMARY OF THE INVENTION

The invention finds application where a trailer is equipped with a booster that can articulate in the horizontal plane so as to be able to yaw in relation to the trailer and that can also articulate in the vertical plane.

According to the invention, a hydraulic cylinder extends at a downward angle from the trailer to the booster. The hydraulic cylinder may be used to normally bias the booster to impose a controlled measure of load sharing with the trailer. A rotary sensor determines whether the booster is yawing in relation to the trailer. When yaw is detected, the pressure applied to the booster by the hydraulic cylinder is reduced to effectively unload the booster and to cause the trailer to absorb more of the load. As a result, the booster-induced forces on the trailer are reduced during the turn.

In one aspect, the invention comprises an articulated heavy haul trailer combination comprising a trailing accessory vehicle coupled to a main trailer by a coupling, the coupling comprises a horizontal hinge attaching the trailing accessory vehicle to the main trailer and allowing the coupling and the trailing accessory vehicle to pitch in a vertical plane. A vertical hinge allows the trailing accessory vehicle to yaw in a horizontal plane and a connector extends between the horizontal hinge and the vertical hinge.

At least one hydraulic piston and cylinder is connected between the main trailer and the coupling for selectively providing a biasing force on the coupling in a vertical plane. The combination further comprises a turn sensor mounted on the combination for detecting that the trailing accessory vehicle is yawing in the horizontal plane in relation to the main trailer. A controller for receiving input from the sensor and, responsive to the input indicating that the trailing accessory vehicle is yawing in relation to the main trailer, controlling the hydraulic piston and cylinder to reduce the downward biasing force on the coupling or to increase an upward biasing force on the coupling.

In another aspect, the invention comprises an articulated heavy haul trailer combination comprising a main trailer and a load-sharing accessory vehicle coupled to the main trailer and adapted to yaw in relation to the main trailer about a vertical axis and to pitch in relation to the main trailer about a horizontal axis, and at least one hydraulic piston and cylinder connected between the main trailer and the accessory vehicle for selectively providing a biasing force on the accessory vehicle about the horizontal axis.

The combination further comprises a turn sensor mounted on the combination for detecting that the accessory vehicle is yawing about the vertical axis, and a controller for receiving input from the sensor and, responsive to the input indicating that the accessory vehicle is yawing in relation to the main trailer, controlling the hydraulic piston and cylinder to reduce a load component of the accessory vehicle in relation to the main trailer.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

Figure 1:
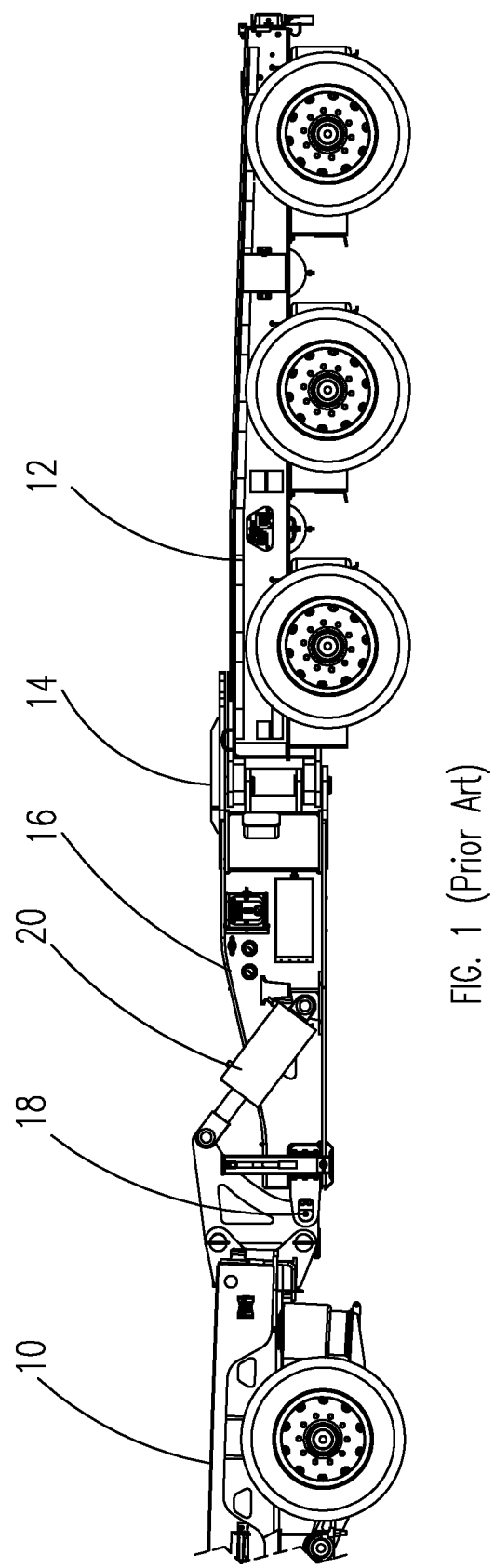
FIG. 1 is a side elevation of a prior art heavy haul trailer and booster combination.
Figure 2:
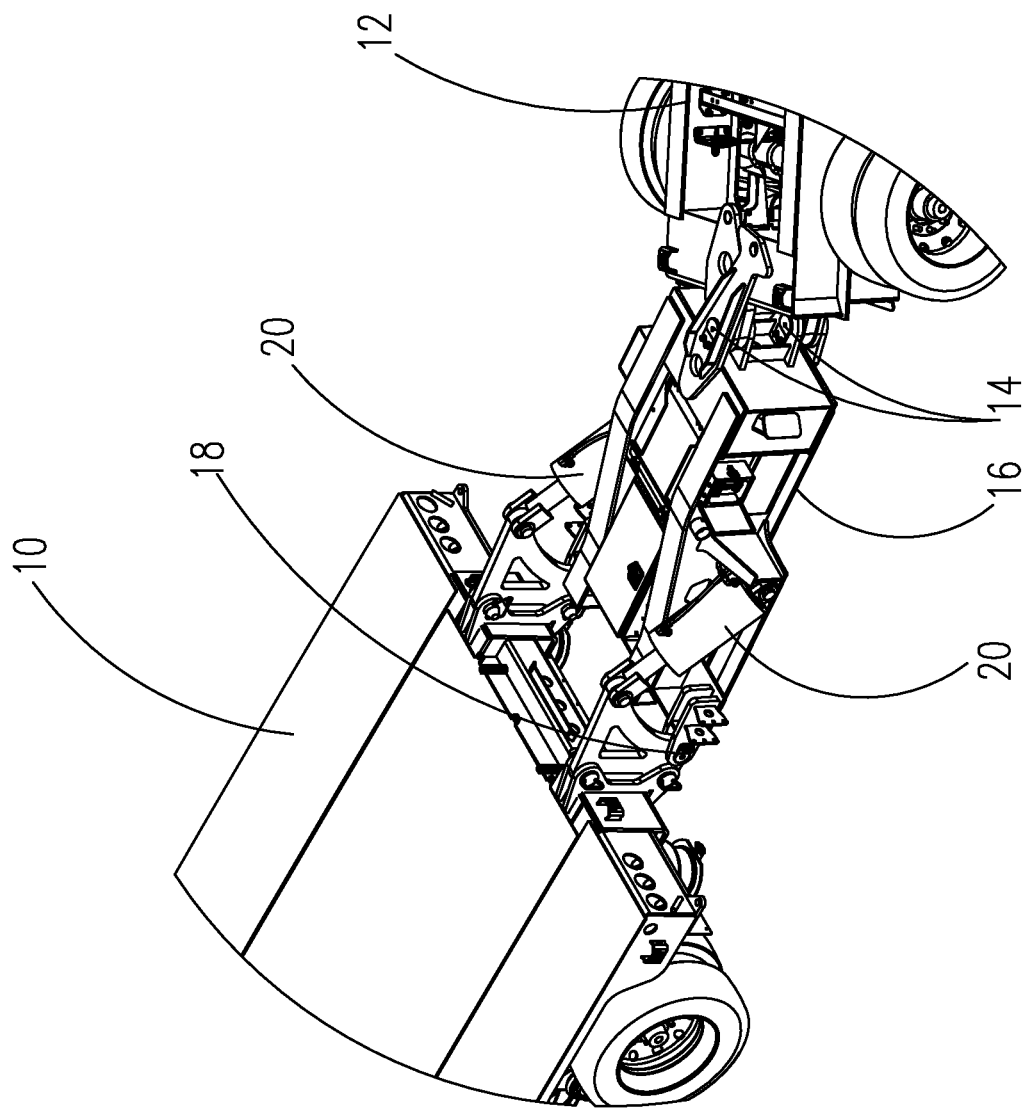
FIG. 2 is a top oblique view showing the articulation of a prior art booster in the horizontal plane (yaw)
Figure 2A:
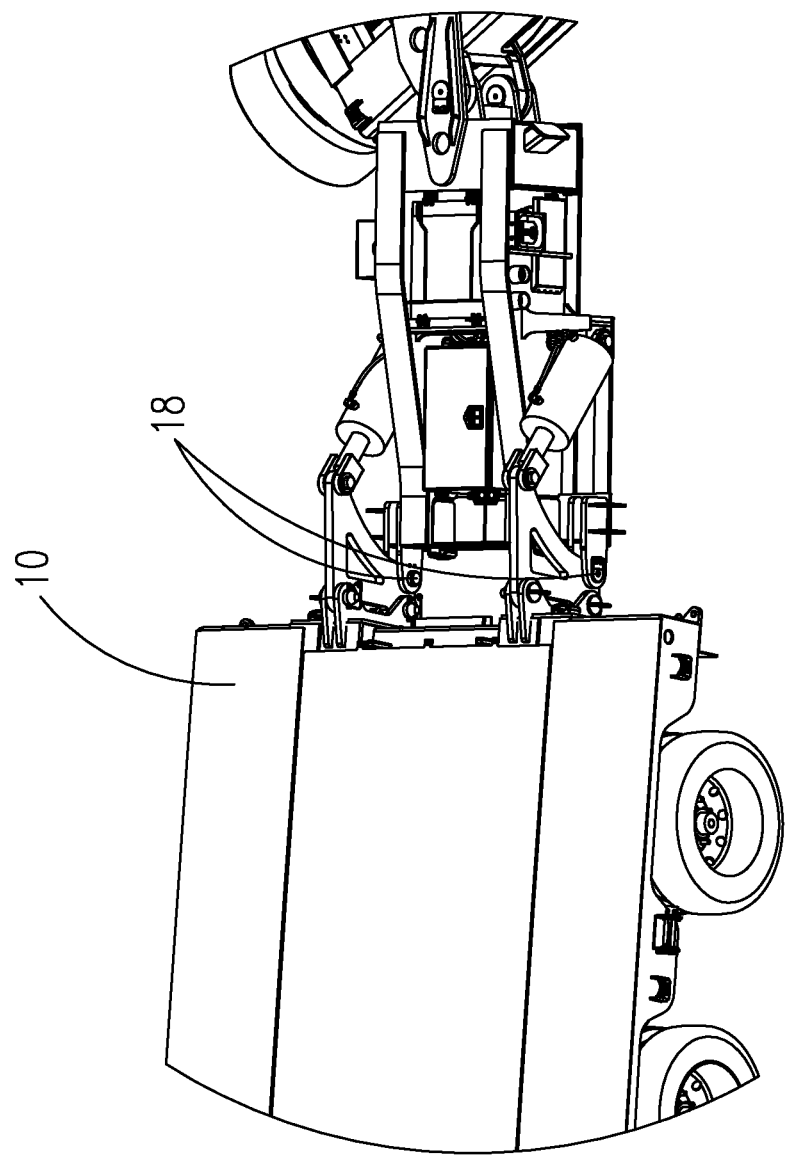
FIG. 2(a) is a top side view showing the articulation of a prior art booster in the horizontal plane (yaw)

DETAILED DESCRIPTION OF AT LEAST ONE MODE FOR CARRYING OUT THE INVENTION IN TERMS OF EXAMPLE(S)

FIGS. 1, 2, 2A and 3 illustrate a prior art trailer 10 and booster 12 combination in which the hitch between them is adapted to allow the booster to yaw in relation to the trailer about vertical pins 14. The hitch comprises a spreader 16 that is adapted to pitch in the vertical plane about a horizontal pin 18. Hydraulic cylinders 20 may be used to bias the spreader 16, and hence the booster 12 itself, down or up about the horizontal pin 18 so as to increase or decrease the load-sharing of the booster.

Figure 3:
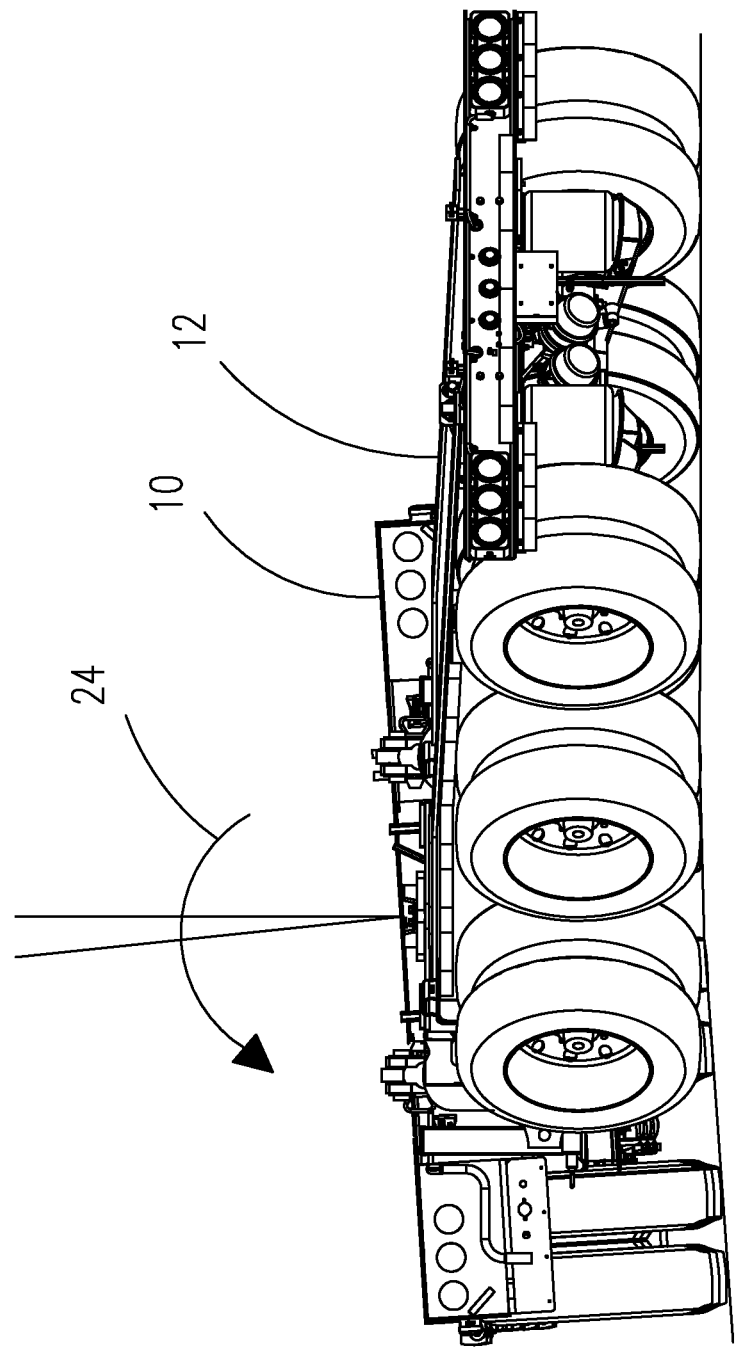
FIG. 3 is a view taken from the rear and side of a prior art booster to illustrate the rolling force induced by a booster during a turn.

Referring to FIG. 3, when a turn is engaged and the main trailer is moving forward, the angular force induced by the yawing trailing accessory vehicle (i.e. the booster in the illustrated embodiment) manifests itself as a turning force as indicated by arrow 24. The present invention seeks to avoid or minimizing such turning force.

Figure 4:
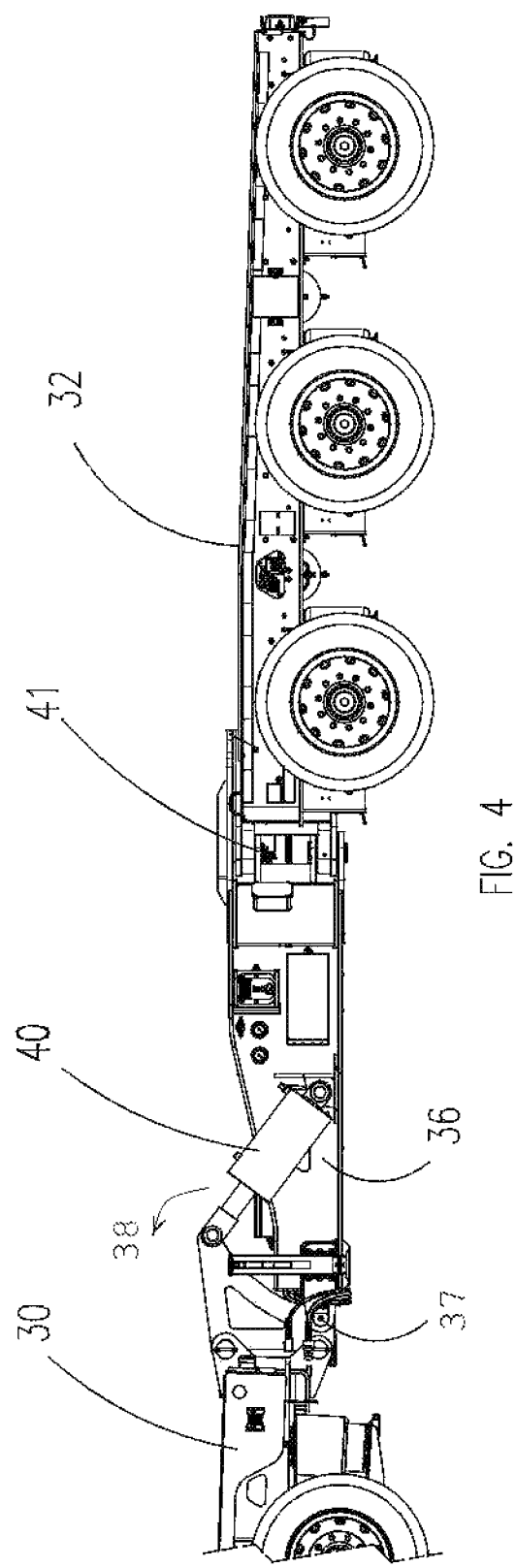
FIG. 4 is a side elevation of a trailer and booster according to the preferred embodiment of the invention, riding straight, the connection between them being adapted for articulation in the vertical and horizontal planes.
Figure 7:
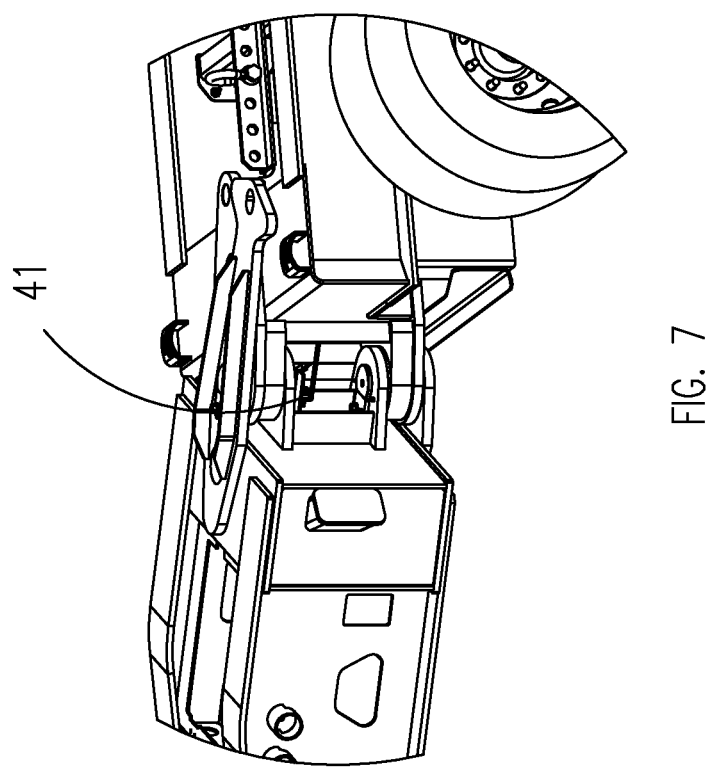
FIG. 7 is an enlarged view of circle A in FIG. 6.

A main trailer 30 and booster 32 combination according to the preferred embodiment of the invention is illustrated in FIGS. 4 and 7.

Figure 5:
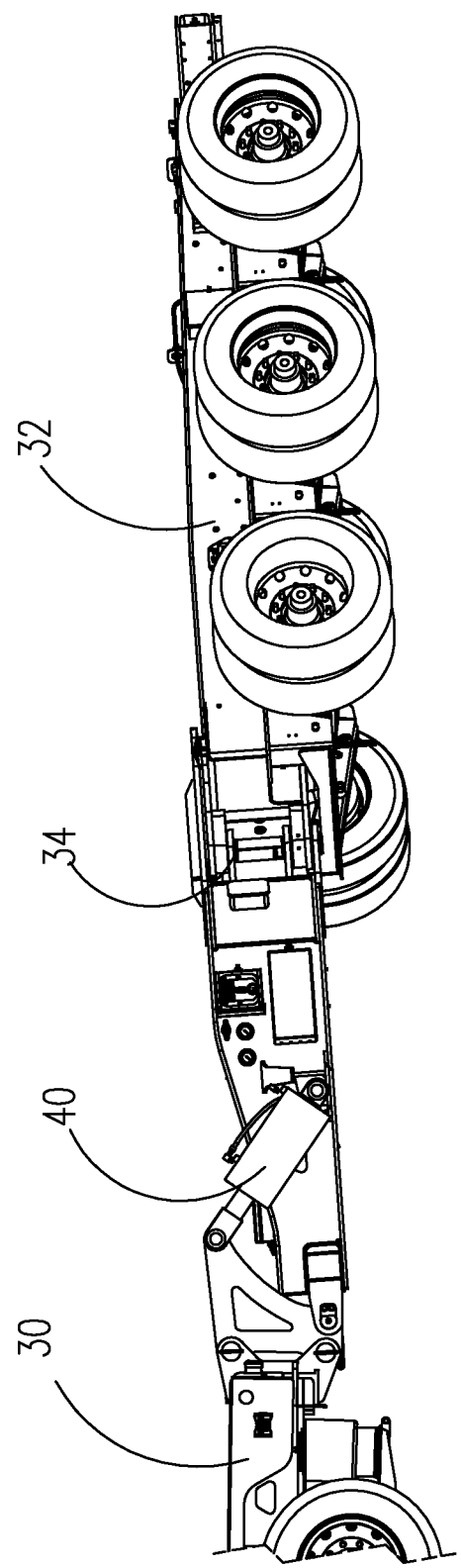
FIG. 5 is a side elevation of a trailer and booster according to the preferred embodiment, in a turn, and showing the hydraulic cylinder retracted to mitigate the booster yaw-induced effects on the trailer.
Figure 6:
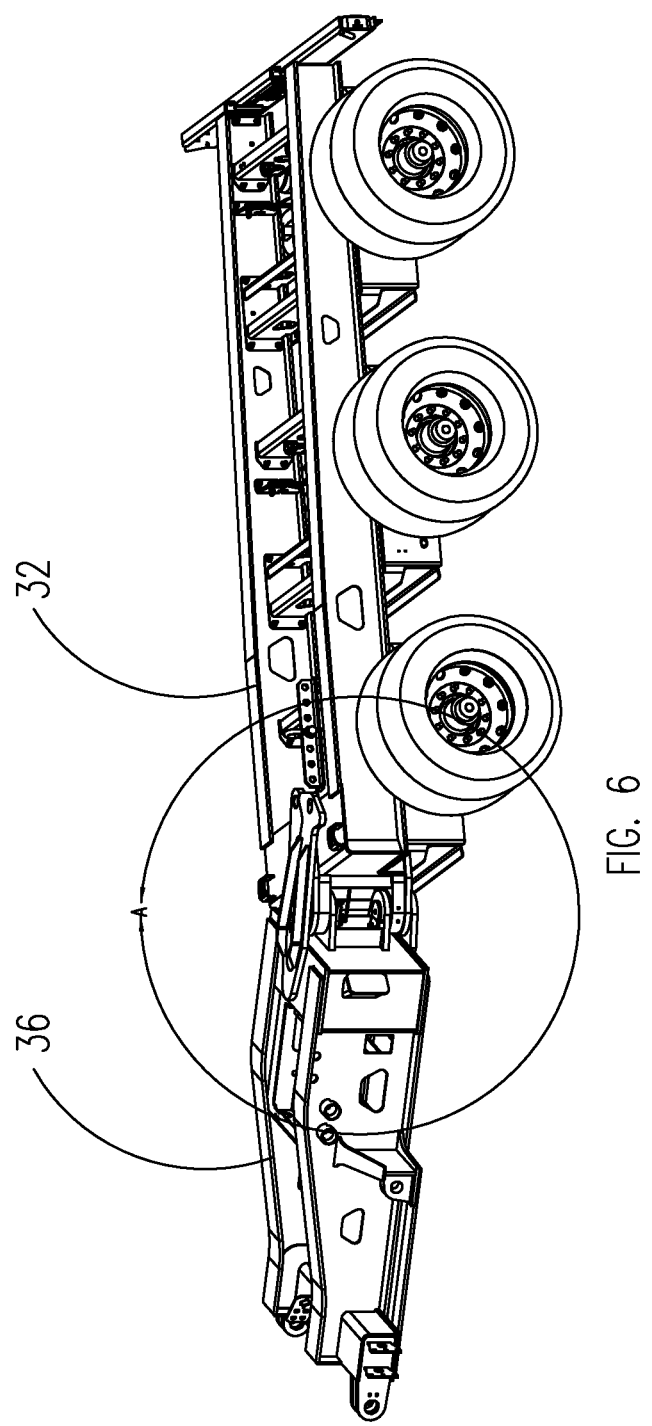
FIG. 6 is a perspective view of the spreader and booster in a turn.

The booster 32 can yaw in the horizontal plane by rotating about vertical hinge or pin 34 (shown in FIG. 5). A connector (i.e. a spreader 36 in the illustrated embodiment) extends between the vertical pin 34 and a horizontal hinge 37 (best seen in FIG. 4) about which the booster can pitch or pivot in the vertical plane (as shown by arrow 38). A pair of hydraulic cylinders 40 extend downward at an angle from the trailer 30 to the spreader 36. According to the preferred embodiment, in normal operation when the main trailer is travelling straight, the hydraulic cylinders 40 apply downward pressure to the spreader 36 (and therefore to the booster 32) to transfer some of the load from the main trailer 30 to the booster 32.

A turn sensor 41 is mounted at the vertical pin 34 to detect the yaw of the accessory vehicle in relation to the main trailer, signifying that the unit is in a turn.

As shown in FIG. 5, when a yaw condition is detected and exceeds a determined threshold turn angle, the downward pressure exerted on the booster by the hydraulic cylinders is reduced, thereby allowing some of the load from the booster to be transferred to the main trailer. As a result, the force tending to disrupt the main trailer's tracking of the turn and the tendency to roll that are induced by the booster are reduced.

The output of sensor 41 is fed to a controller that controls the pressure exerted on the spreader 36 (and indirectly on the booster 32) by the hydraulic cylinders 40. The predetermined threshold turn angle is provided to avoid actuating the cylinders 40 in response to negligible turn angles. Beyond the threshold, the controller acts to relieve the pressure exerted by the cylinders on the booster as a function of the turn angle and the speed of the trailer.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. An articulated heavy haul trailer combination comprising:
   a trailing accessory vehicle coupled to a main trailer by a coupling, said coupling comprising a horizontal hinge attaching said trailing accessory vehicle to said main trailer and allowing said coupling and said trailing accessory vehicle to pitch in a vertical plane, a vertical hinge allowing said trailing accessory vehicle to yaw in a horizontal plane and a connector extending between said horizontal hinge and said vertical hinge;
   at least one hydraulic piston and cylinder connected between said main trailer and said coupling for selectively providing a biasing force on said coupling in a vertical plane;
   characterized in that:
   said combination further comprises a turn sensor mounted on said combination for detecting that said trailing accessory vehicle is yawing in said horizontal plane in relation to said main trailer; and,
   a controller for receiving input from said sensor and, responsive to said input indicating that said trailing accessory vehicle is yawing in relation to said main trailer, controlling said hydraulic piston and cylinder to reduce the downward biasing force on said coupling or to increase an upward biasing force on said coupling.

2. An articulated heavy haul trailer combination comprising:
   a main trailer and a load-sharing accessory vehicle coupled to said main trailer and adapted to yaw in relation to said main trailer about a vertical axis and to pitch in relation to said main trailer about a horizontal axis;
   at least one hydraulic piston and cylinder connected between said main trailer and said accessory vehicle for selectively providing a biasing force on said accessory vehicle about said horizontal axis;
   characterized in that:
   said combination further comprises a turn sensor mounted on said combination for detecting that said accessory vehicle is yawing about said vertical axis; and,
   a controller for receiving input from said sensor and, responsive to said input indicating that said accessory vehicle is yawing in relation to said main trailer, controlling said hydraulic piston and cylinder to reduce a load component of said accessory vehicle in relation to said main trailer.

* * * * *